United States Patent Office 3,044,313
Patented July 17, 1962

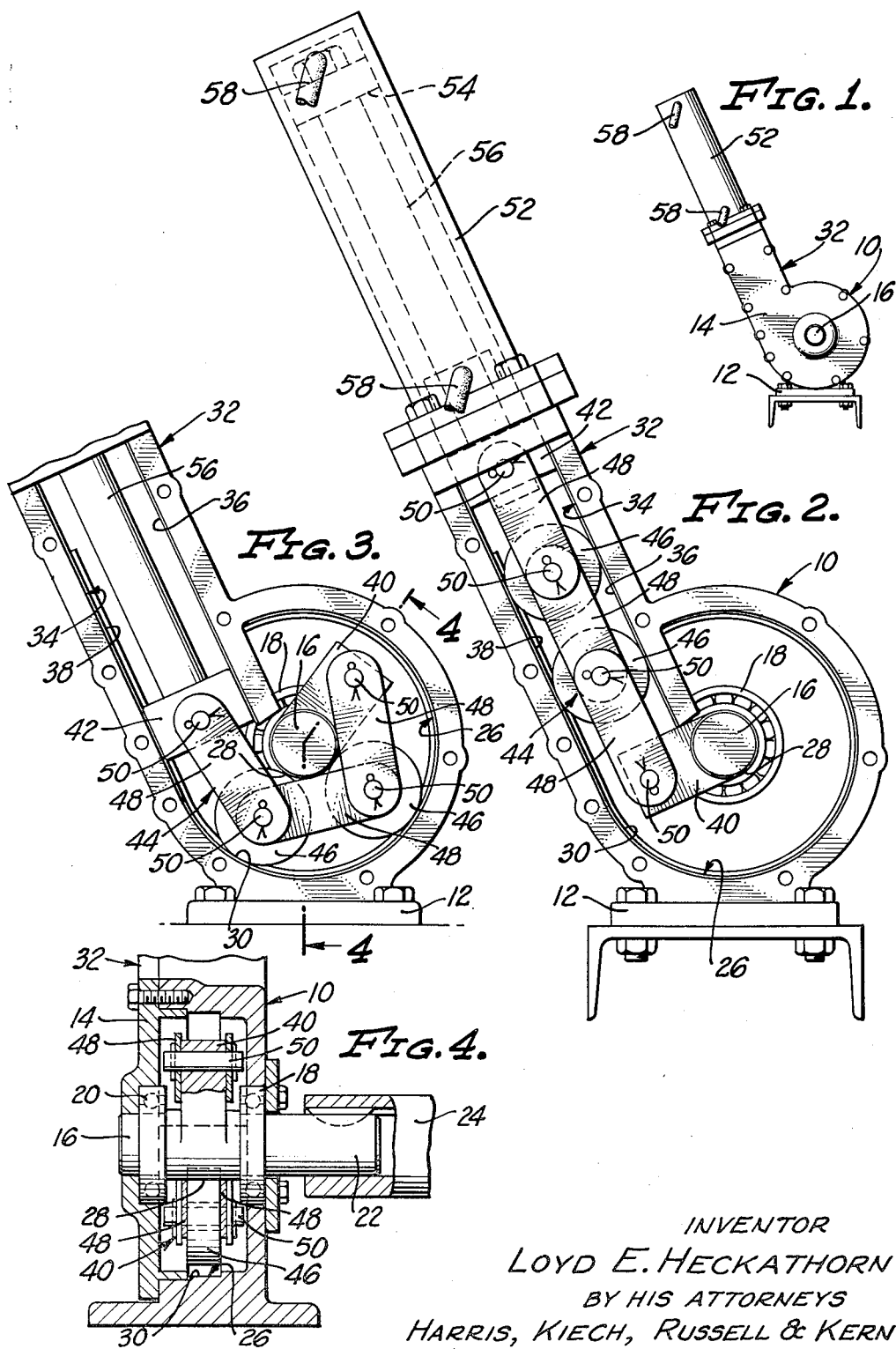

3,044,313
APPARATUS FOR CONVERTING RECIPROCATORY MOTION TO OSCILLATORY MOTION
Loyd E. Heckathorn, Garden Grove, Calif., assignor to Towner Manufacturing Company, Santa Ana, Calif., a corporation of California
Filed Nov. 14, 1960, Ser. No. 69,075
2 Claims. (Cl. 74—108)

The present invention relates in general to an apparatus for converting reciprocatory motion to oscillatory motion and, more particularly, to means for translating reciprocatory motion of an actuator into oscillatory motion of a shaft, or the like.

In general, the invention contemplates an apparatus which includes a shaft, or the like, mounted for oscillatory motion about its axis, a crank on the shaft, arcuate guide means concentric with and spaced radially outwardly from the axis of the shaft, linear guide means forming a tangential continuation of the arcuate guide means, an actuator movable linearly along a path coinciding with the linear guide means, and flexible connecting means disposed in the arcuate guide means and the linear guide means and interconnecting the actuator and the crank for displacing the shaft about its axis in response to movement of the actuator along its path.

An important object of the invention is to provide an apparatus of the foregoing nature wherein the flexible connecting means is so confined by the arcuate guide means and the linear guide means that it is capable of acting both in compression and in tension, whereby reciproatory motion of the actuator along its path is converted into oscillatory motion of the shaft about its axis.

More particularly, an object of the invention is to provide an arcuate guide means which includes concentric, inner and outer arcuate tracks spaced radially outwardly from the axis of the shaft, a linear guide means which includes spaced, parallel, inner and outer linear tracks respectively tangent to the inner and outer arcuate tracks, and flexible connecting means interconnecting the actuator and the crank and engageable with both arcuate tracks and both linear tracks as the flexible connecting means moves along the arcuate guide means and the linear guide means, whereby the flexible connecting means is so confined that it is capable of both pushing and pulling tangentially on the crank, as the actuator reciprocates, to oscillate the shaft about its axis.

A further object is to provide a flexible connecting means which includes a series of rollers each engageable with both arcuate tracks, or both linear tracks, and includes a series of links pivotally interconnecting the rollers and pivotally connecting the end rollers of the series to the actuator and the crank.

Another object of the invention is to provide an apparatus of the foregoing nature wherein the inner arcuate track is formed by a portion of the peripheral surface of the shaft, the outer arcuate track and the inner and outer linear tracks being formed by a housing in which the shaft is mounted for oscillatory motion.

Still another object of the invention is to provide means for reciprocating the actuator which includes a cylinder mounted on the housing in alignment with the linear guide means and at the end of the linear guide means farthest from the arcuate guide means, a piston in the cylinder, a piston rod interconnecting the piston and the actuator, and means for admitting operating fluid under pressure into the cylinder on opposite sides of the piston to reciprocate the piston in the cylinder.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawing, in which:

FIG. 1 is an elevational view, on a reduced scale, of an apparatus of the invention for converting reciprocatory motion to oscillatory motion;

FIG. 2 is a view similar to FIG. 1, but on a larger scale and with a cover of a housing of the apparatus removed to reveal internal components;

FIG. 3 is a fragmentary view duplicating a portion of FIG. 2, but illustrating various components in different operating positions; and FIG. 4 is a sectional view taken along the arrowed line 4—4 of FIG. 3 of the drawing.

In the drawing, the numeral 10 designates a housing having a mounting base 12 and a removable cover 14. Oscillatable in the housing 10 is a shaft 16 mounted in bearings 18 and 20 respectively carried by the housing proper and by the cover 14. The shaft 16 is provided with a projecting end 22 to whcih any structure 24 to be oscillated between two extreme positions may be connected.

Within the housing 10 is an arcuate guide means 26 concentric with and spaced radially outwardly of the axis of the shaft 16. The arcuate guide means 26 includes concentric, inner and outer arcuate tracks 28 and 30 spaced radially outwardly from the axis of the shaft 16. In the particular construction illustrated, the inner arcuate track 28 is formed by a portion of the peripheral surface of the shaft 16, and the outer arcuate track 30 is formed by a portion of the housing 10.

The portion of the housing 10 in which the arcuate guide means 26 is located is shown as generally cylindrical, and the housing is provided with a tangential extension 32 containing a linear guide means 34 which forms a tangential continuation of the arcuate guide means. More particularly, the linear guide means 34 includes spaced, parallel, inner and outer linear tracks 36 and 38 respectively tangent to the inner and outer arcuate tracks 28 and 30. The linear tracks 36 and 38 are formed by portions of the tangential housing extension housing 32 in the construction illustrated.

The shaft 16 is provided thereon with a crank 40 which is adapted to swing back and forth within the arcuate guide means 26 as the shaft oscillates about its axis. The two extreme positions of the crank 40 are shown in FIGS. 2 and 3, respectively.

Reciprocable along a path coinciding with the axis of the linear guide means 34 is an actuator 42. In the particular construction shown, the actuator 42 is a crosshead which is slidable along the linear tracks 36 and 38.

The actuator 42 and the crank 40 are interconnected by a flexible connecting means 44 which is so confined by the arcuate guide means 26 and the linear guide means 34 that it is capable of acting both in compression and in tension. In other words, the flexible connecting means 44 is capable of transmitting both push and pull forces to the crank 40 so as to pivot the shaft 16 irrespective of the direction of movement of the actuator 42.

Considering the flexible connecting means 44 more specifically, it includes a series of rollers 46, two being shown, each of which is engageable with both of the arcuate tracks 28 and 30 and wiht both of the linear tracks 36 and 38. The flexible connecting means 44 also includes a series of link means 48, three being shown, one of which pivotally interconnects the rollers 46, another of which pivotally connects the series of rollers to the crank 40, and the third of which pivotally connects the series of rollers to the actuator 42, the pivotal connections being provided by pivot pins 50. Preferably, the various link means 48 comprise paired links embracing the crank 40, the actuator 42 and the rollers 46, as shown in FIG. 4 of the drawing.

Connected to the outer end of the tangential housing extension 32 is a cylinder 52 the axis of which coincides with the axis of the linear guide means 34. Within the cylinder 52 is a piston 54 which is connected to the actuator 42 by a piston rod 56. Operating fluid lines 58 communicate with the ends of the cylinder 52 on opposite sides of the piston 54. The operating fluid lines 58 may be controlled by a selector valve, not shown, so that either end of the cylinder 52 may be pressurized to displace the piston 54 toward the opposite end of the cylinder.

Considering the operation of the invention, when the outer end of the cylinder 52 is pressurized to cause movement of the piston 54 toward the inner end of the cylinder, the actuator 42 is caused to move linearly along the linear guide means 34 toward the arcuate guide means 26. Under such conditions, the rollers 46 of the flexible connecting means 44 are confined by the linear tracks 36 and 38, while they are within the linear guide means 34, and by the outer arcuate track 30, while they are within the arcuate guide means 26, so that the flexible connecting means 34 acts in compression to rotate the shaft 16 in the counterclockwise direction from the position shown in FIG. 2 of the drawing to that shown in FIG. 3 thereof. Conversely, if the inner end of the cylinder 52 is pressurized to cause the piston 54 to move toward the outer end of the cylinder and to cause the actuator 42 to move away from the arcuate guide means 26, the rollers 46 engage the inner arcuate track 28, while within the the arcuate guide means 26, to enable the flexible connecting means 44 to act in tension to apply a pull force to the crank 40. Consequently, the shaft 16 is rotated from the position shown in FIG. 3 of the drawing to that shown in FIG. 2 thereof.

Thus, the present invention provides a structure wherein the flexible connecting means 44 is so confined or constrained that its is capable of acting both in tension and compression. Consequently, linear motion of the actuator 42 in either direction is converted to rotary motion of the shaft 16 in the corresponding direction with the single flexible connecting means 44, which is an important feature of the invention.

The apparatus of the invention may be utilized wherever conversion of reciprocatory motion to oscillatory motion is required, as in rotating any structure to be actuated between two operating positions. For example, the apparatus of the invention may be utilized in conjunction with a tractor-drawn rollover plow to swing the plow between its two operating positions. With such an installation, the opeerating fluid necessary to displace the piston 54 from one end of the cylinder 52 to the other is provided by the hydraulic system of the tractor.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In an apparatus for converting between reciprocatory motion and oscillatory motion, the combination of:
    (a) a shaft;
    (b) means mounting said shaft for oscillatory motion about its axis;
    (c) a crank on said shaft;
    (d) arcuate guide means including concentric, inner and outer arcuate tracks spaced radially outwardly from said axis of said shaft;
    (e) said inner arcuate track being formed by a cylindrical portion of said shaft;
    (f) linear guide means including spaced, parallel, inner and outer linear tracks respectively tangent to and forming continuations of said inner and outer arcuate tracks;
    (g) a linearly movable member engaging and movable along said linear tracks;
    (h) flexible connecting means interconnecting said crank and said member and engageable with and movable along said arcuate tracks and said linear tracks;
    (i) said flexible connecting means including a series of rollers engageable with and rollable along said arcuate tracks and said linear tracks; and
    (j) said flexible connecting means including a series of links pivotally interconnecting said rollers of said series and pivotally connecting said series of rollers to said member and said crank.

2. In an apparatus for converting between reciprocatory motion and oscillatory motion, the combination of:
    (a) a shaft;
    (b) means mounting said shaft for oscillatory motion about its axis;
    (c) a crank on said shaft;
    (d) arcuate guide means including concentric, inner and outer arcuate tracks spaced radially outwardly from said axis of said shaft;
    (e) said inner arcuate track being formed by a cylindrical portion of said shaft;
    (f) linear guide means including spaced, parallel, inner and outer linear tracks respectively tangent to and forming continuations of said inner and outer arcuate tracks;
    (g) a linearly movable member engaging and movable along said linear tracks;
    (h) flexible connecting means interconnecting said crank and said member and engageable with and movable along said arcuate tracks and said linear tracks;
    (i) said flexible connecting means including a series of rollers engageable with and rollable along said arcuate tracks and said linear tracks;
    (j) said flexible connecting means including a series of links pivotally interconnecting said rollers of said series and pivotally connecting said series of rollers to said member and said crank; and
    (k) the diameter of said rollers being larger than that of said cylindrical portion of said shaft.

References Cited in the file of this patent

UNITED STATES PATENTS

| | | |
|---|---|---|
| 1,891,312 | Knecht | Dec. 20, 1932 |
| 1,944,454 | Park | Jan. 23, 1934 |
| 2,087,138 | Brick | July 13, 1937 |
| 2,446,415 | Flurscheim et al. | Aug. 3, 1948 |
| 2,461,429 | Larson | Feb. 8, 1949 |
| 2,531,614 | De Pew | Nov. 28, 1950 |
| 2,587,454 | Fletcher et al. | Feb. 26, 1952 |
| 2,781,026 | Schlotter et al. | Feb. 12, 1957 |

FOREIGN PATENTS

| | | |
|---|---|---|
| 437,109 | Great Britain | Oct. 21, 1935 |